(No Model.) 2 Sheets—Sheet 1.
T. J. BARTLETT.
INDICATOR.
No. 381,460. Patented Apr. 17, 1888.
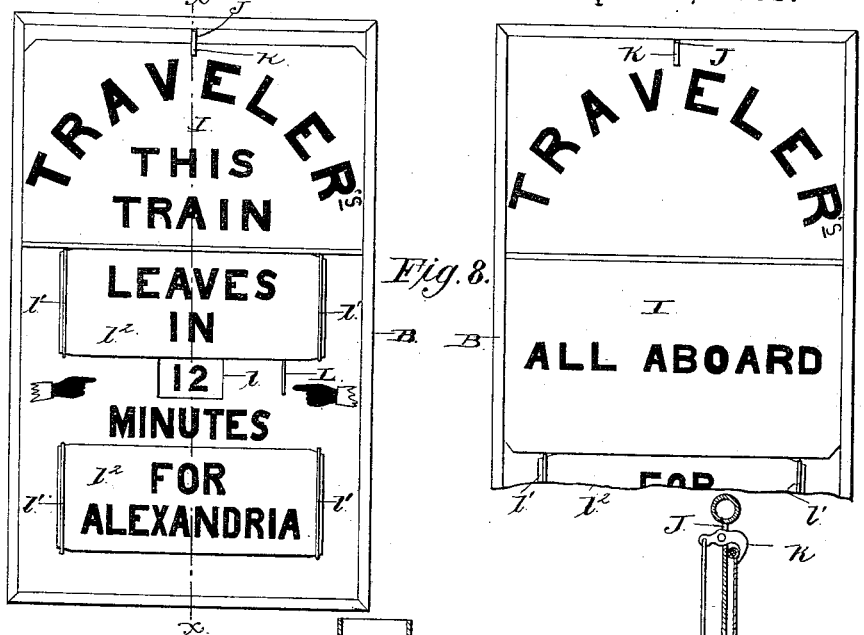
Fig. 1.
Fig. 8.
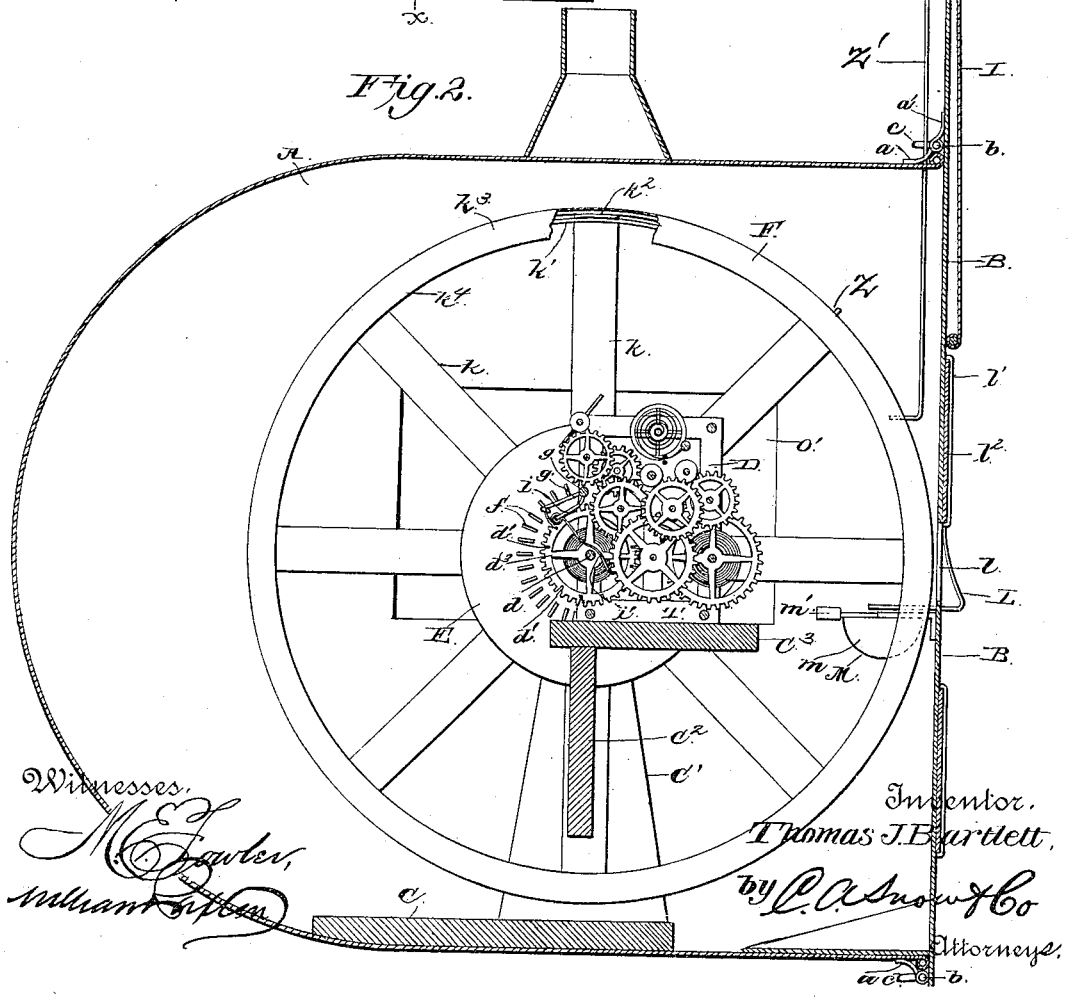
Fig. 2.
Witnesses
Inventor.
Thomas J. Bartlett,
by C. A. Snow & Co
Attorneys.

(No Model.) 2 Sheets—Sheet 2.

T. J. BARTLETT.
INDICATOR.

No. 381,460. Patented Apr. 17, 1888.

Witnesses.

Inventor,
Thomas J. Bartlett,
by C. A. Snow & Co.
Attorneys.

UNITED STATES PATENT OFFICE.

THOMAS J. BARTLETT, OF KNOXVILLE, TENNESSEE, ASSIGNOR OF ONE-HALF, BY DIRECT AND MESNE ASSIGNMENTS, TO JOHN C. GUNN, C. W. ROGAN, AND C. OLDHAM, OF SAME PLACE, AND HOWARD J. BARLOW, OF POMONA, FLORIDA.

INDICATOR.

SPECIFICATION forming part of Letters Patent No. 381,460, dated April 17, 1888.

Application filed August 25, 1887. Serial No. 247,565. (No model.)

*To all whom it may concern:*

Be it known that I, THOMAS J. BARTLETT, a citizen of the United States, residing at Knoxville, in the county of Knox and State of Tennessee, have invented a new and useful Improvement in Indicators, of which the following is a specification.

This invention has reference to devices for indicating appointed periods—such as are, for instance, required in railway-stations for indicating the departure or arrival of trains, or in other application in an office wherein it may be desirable to show the probable time of return of a party; and the said invention consists in the improved construction, hereinafter described, whereby an efficient indicator is provided, and one that may be readily and conveniently adjusted to secure the necessary and certain operation.

Figure 3:
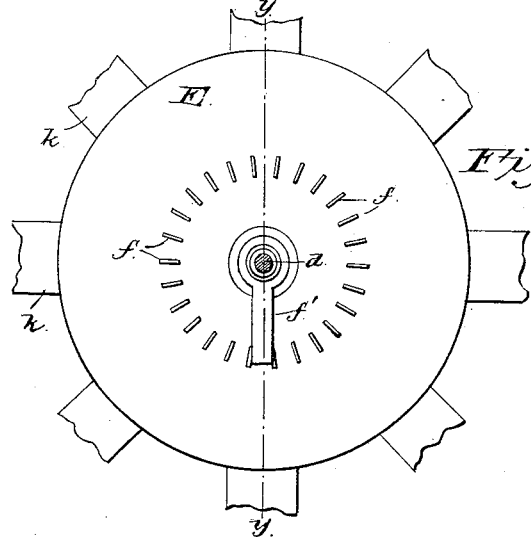
Figure 4:
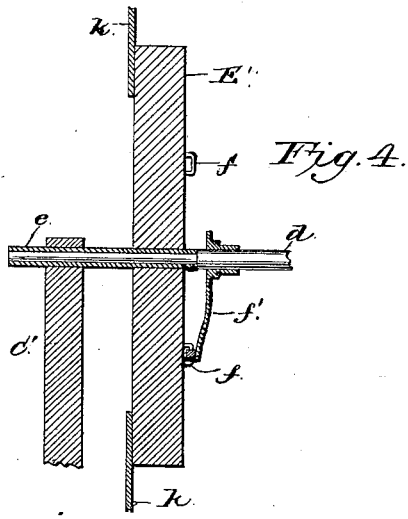
Figure 5:
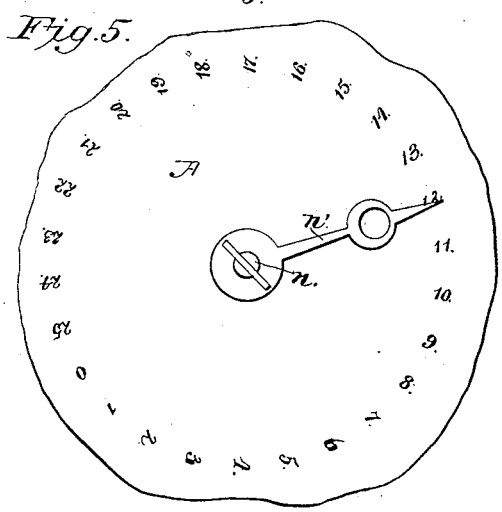
Figure 9:
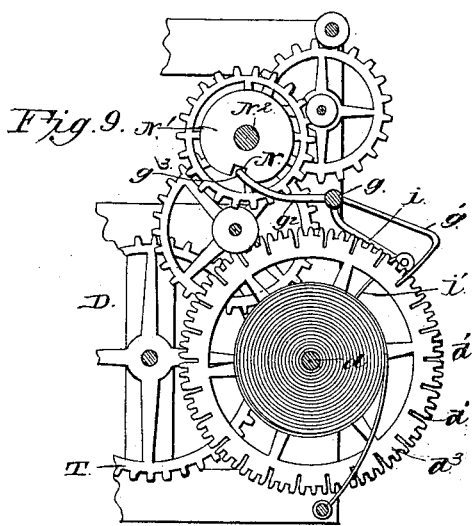
Figure 6:
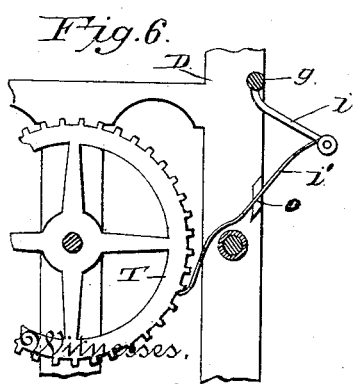
Figure 7:
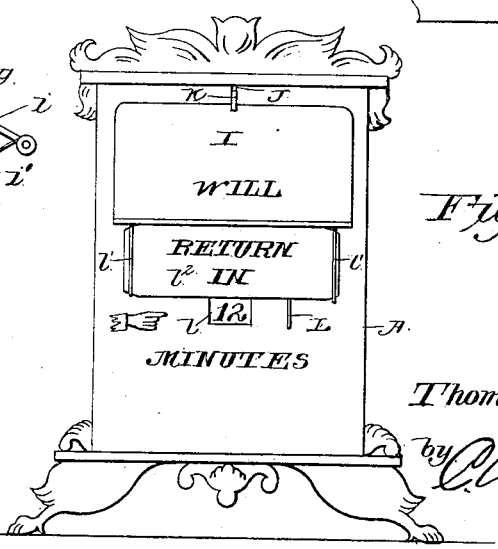

In the accompanying drawings, forming part of this specification, Figure 1 is a front view of an indicator constructed in accordance with my invention. Fig. 2 is a vertical sectional elevation on the dotted line $x\ x$ of Fig. 1. Fig. 3 is a detail view of the central portion of the number-wheel and the dog engaging the same. Fig. 4 is a section of said wheel and dog on the dotted line $y\ y$ of Fig. 3. Fig. 5 is a detail view of the side of the case, illustrating the device for adjusting the number-wheel. Fig. 6 is a detail view; Fig. 7, a view showing the indicator in a form adapted for office and other use, and Fig. 8 is a detail front view showing the leaf dropped. Fig. 9 is a detail sectional view.

A refers to the trunk of the case, which, as represented in Fig. 2, has its rear portion of a circular configuration, while its front portion is extended horizontally at the top and bottom, the latter serving as a base for the machine to rest upon. The trunk A is open at its front side, and is provided at its side, top, and bottom edges with a pair of loops, $a$, which are located a short distance from each other and adapted for the insertion of wire keys $b$, each having a central bent portion, $c$, to facilitate the use of said keys.

A front plate, B, is shown most clearly in Figs. 1 and 2, and has at its rear side four loops, $a'$, which are so located that when said plate is placed in position each of said loops will rest between a pair of the loops $a$, so that the keys $b$ can be inserted therethrough, in order to secure but removably attach the front plate, B, to the trunk.

While I have described the arrangement of loops and keys as being the features illustrated in the drawings, I wish it understood that I do not limit myself to such arrangement of fastening devices, as it will be evident that other means may be employed for attaching the plate to the trunk and still be within the scope of my invention. A block or base, C, is of such size that it may be readily inserted in said trunk to rest upon the bottom of the same, and upon said block is mounted a pair of standards, $C'\ C^2$, the standard $C'$ extending a short distance above the standard $C^2$, while the latter carries at its upper side a platform, $C^3$. Upon the platform $C^3$ is mounted the clock mechanism D for actuating the device, and the said clock mechanism, with slight modification, may be of any suitable arrangement or construction.

In the present case I have represented a clock mechanism having two sets of spring-actuated gearing which correspond, respectively, with the main and striking mechanism in an ordinary clock mechanism.

In the present case, for the sake of clearness, the arrangement corresponding with the striking mechanism will be designated the "number-wheel mechanism," since its function is to rotate the number-wheel when necessary. A shaft, $d$, of the number-wheel mechanism carries a wheel, $d^3$, having a series of recesses, $d'$, in its periphery, the space between each pair of recesses indicating the interval of rotation of the number-wheel. The said shaft $d$ is extended from the clock-work on one side and rests in a bearing therefor in the upper side of the standard $C'$, so that the extremity of said shaft will project through an opening in the side of the trunk A. A sleeve, $e$, is mounted on said shaft $d$, so that the latter can rotate freely therein, and to the inner end of said sleeve is secured the disk or hub E of the number-wheel F. The inner face or side of said disk is provided with circular series of projections $f$, which are adapted to engage the end of a dog, $f'$, extending radially from the shaft $d$ and rigidly connected to the shaft $d$. This dog is made from spring metal, so that its engaging portion will have a limited movement from the disk to avoid the projections when necessary. A work-shaft, $g$, in the number-wheel mechanism is provided with a dog or pawl, $g'$, which is bent, as seen in Fig. 2, so that its flat end will engage the recesses $d'$ in the wheel $d^3$. A second pawl, $g^2$, also extends from the shaft $g$, but in an opposite direction, and has its end $g^3$ bent horizontally, so as to engage a single recess, N, in a disk, N′, mounted on a shaft, N², and thereby lower the pawl $g'$ and retain the latter in engagement with one of the recesses of the wheel $d^3$. An arm, $i$, extends down from the shaft $g$ in a direction similar to the pawl $g'$, and said arm has a horizontal portion upon which is pivotally hung a trip-plate, $i'$, the lower end of which engages the gear-teeth of the wheel T of the main mechanism.

The wheel F consists of a series of spokes, $k$, which are connected to the hub and extend radially therefrom and are bent horizontally at their outer portions, where they are connected together by two circular wires, $k'\, k^2$, which form in connection therewith a peripheral supporting portion upon which is secured a band, $k^3$, of any suitable material, provided with a series of figures on its peripheral face. For railway purposes it will be sufficient to have the numbers range from 1 up to 50 or 60, to indicate the minute-divisions of an hour. A zero-space is interposed between the first and last number. The side portions of the number-band $k^3$ are preferably turned down to form annular strengthening-flanges $k^4$.

The plate B is provided with an aperture, $l$, for exposing the number of the wheel opposite the same, and on said plate, above and below said aperture, are vertical wire loops $l'$, in which may be inserted and retained removable panels $l^2$, containing subject-matter to assist in the object of the device. A leaf, I, is horizontally hinged at one of its edges to the face of the plate B. A slot, J, is located in the upper portion of the plate B, and within said slot is pivotally hung a dog, K, one portion of which extends beyond the front side of the slot to engage and hold the leaf I in the position represented in Fig. 1 when said leaf is swung upward. The rear portion of said dog has a depending rod, Z′, to be struck and tripped by a stud, Z, that projects from the periphery of the wheel when the zero-space of the wheel shall have arrived opposite the opening $l$, and thus causing the leaf I to be released and dropped to cover said aperture and expose subject-matter on its opposite side, indicating that the appointed time has arrived.

A wire rod, L, is located on the plate B, so that a portion thereof will project at the front side, so as to be struck by the door as it drops, and thereby depress said rod and cause it to actuate alarm mechanism M on the opposite side of the plate.

One form of alarm mechanism consists of a bell, $m$, and a hammer, $m'$, which is normally held against the bell by means of a tension-spring. The free end of the hammer is designed to be moved by the inner bent end of the rod L when the latter is moved by the leaf-plate I.

The outer end of the sleeve $e$ is squared to receive a key, $n$, which carries an index-hand, $n'$, designed to operate in connection with a circular series of figures on the side of the trunk A corresponding with the figures in the number-band. By rotating the key $n$ the sleeve $e$ will be revolved relative to the shaft $d$, so that the disk or hub E will be also rotated to cause its projections to force back the spring-dog $f'$, and permit the wheel to be moved so as to bring any desired number opposite the aperture in the plate B. By forcing the dog back, and thereby disengaging it from the disk, the adjustment of the number-wheel can be effected independent of the clock mechanism. The operation of the number-wheel mechanism is such that when released it rotates the wheel in a direction to bring numbers of decreased denominations necessarily opposite the aperture until the zero-space is exhibited and the leaf drops, as before stated.

The main mechanism operates to cause the trip-plate $i'$ to be forced out of engagement from the teeth of the wheel, engaged thereby at an interval corresponding with each movement of the number-wheel, so that said trip-plate will rock the shaft $g$ to disengage the pawls $g'\, g^2$ from their respective disengaging portions, and thus liberating the actuating devices of the shaft $d$ and permitting the wheel $d^3$ to rotate to bring another of its recesses, $d'$, for the end of the dog $g'$ to drop into.

While I have shown the recesses $d'$ to be arranged equidistant in the wheel $d^3$, I may, if desirable, vary the distance between them, so that varying intervals of rotation will be occasioned in a manner that is obvious.

As shown in the detail view, Fig. 6, the frame-work of the clock mechanism is provided with a groove, O, in which the trip-plate plays, this said groove serving to prevent any other movement of said trip-plate than one in the direction of its length. The advantage of this arrangement will be understood when it is explained that should the main mechanism run down before the wheel mechanism the actuation of the latter would be prevented, since it would be impossible for the trip-plate to ride freely over the gear-wheel of the main mechanism, into which it ordinarily engages.

Instead of having the projections on the side of the wheel E, it will be found desirable to place them on the periphery of said wheel, in which event the spring-pawl will be extended so that its horizontal portion can be moved laterally into and out of engagement with said projections.

While I have described my improvements in connection with a railway-indicator, it will be understood that they may be applied to devices designed for many other purposes. Thus, for instance, in Fig. 7 I have shown improvements embodied in such compact form as will enable the device to be used for office purposes to indicate its engagements of different character. Such an arrangement will be especially useful in indicating the return of the occupant of an office.

Many other modifications and changes may be resorted to without departing from the spirit of my invention.

A door, O', is hinged at one side of the case to permit ready access to the clock mechanism.

The devices for supporting the clock-work mechanism permit the bodily removal of the latter from the trunk after the plate B has been disconnected therefrom.

The vertical position of the number-wheel enables it to be released more fully, since its vertical position secures a balancing effect.

I claim—

1. The combination, in an indicator, of a case having an inspection-opening in said case, clock mechanism having an intermittently-rotating wheel, a leaf hinged on said case, and devices operated by the wheel to drop said leaf when a predetermined point of said wheel arrives opposite said opening, substantially as described.

2. The combination, in an indicator, of a case having an inspection-opening, a leaf hinged on said case, a clock mechanism having an intermittently-rotating wheel, F, the dog K to engage the leaf when the latter is turned upward, and connections between said dog and wheel whereby the latter will trip the dog and release the leaf when a predetermined point on said wheel reaches the inspector-opening, substantially as described.

3. The combination, in an indicator, of the case having the inspection-opening and the hinged leaf I, the dog K, engaging said leaf when the same is raised and having the rod Z', and the clock mechanism having the intermittently-rotating wheel F, provided with stud Z, to operate the rod Z', for the purpose set forth, substantially as described.

4. In an indicator, the clock mechanism having the toothed wheel T and the notched spring-actuated wheel $d^3$, in combination with the rock-shaft $g$, having the pawl $g'$ engaging wheel $d^3$, and the pawl $g^2$, the tripping devices connected to said rock-shaft and engaging the wheel $d^3$, and the cam N', having notch N to receive pawl $g^2$, and the intermittingly-rotating wheel F, substantially as described.

5. In an indicator-clock mechanism, the combination of the toothed wheel T, the spring-actuated notched wheel $d^3$, the gearing connected to wheel $d^3$, and having the cam N', provided with notch N, the rock-shaft having the pawl $g^2$ engaging notch N, the pawl $g'$, engaging the wheel $d^3$, and the arm $i$, and the trip $i'$, connected to the arm $i$ and engaging the wheel T, and the intermittingly-rotating wheel F, substantially as described.

6. In an indicator, the combination, with the shaft $d$ and its actuating mechanism, of the sleeve $e$, loose on said shaft, the number-wheel having its hub secured to said sleeve and provided with the projections $f$, and the spring-pawl $f'$, rigidly secured to shaft $d$ and adapted to engage said projections, substantially as described.

7. In an indicator, the combination of the case having the hinged leaf, the clock mechanism having an intermittently-rotating wheel, devices operated by said wheel to drop the leaf when the wheel reaches a certain predetermined point in its revolution, the alarm mechanism, and the rod L to actuate the same, the said rod being struck by the leaf when the latter drops, substantially as described.

8. The combination, with the actuating and tripping mechanism, of the number-wheel having the spokes bent horizontally and connected by wire rings, a number-band having its side portions bent to form flanges, substantially as described.

In testimony that I claim the foregoing as my own I have hereto affixed my signature in presence of two witnesses.

THOMAS J. BARTLETT.

Witnesses:
J. C. GUNN,
JOHN H. SIGGERS.